United States Patent [19]

Leonard et al.

[11] 4,221,824
[45] Sep. 9, 1980

[54] METHOD FOR ENAMELING FERROUS OBJECTS

[75] Inventors: Ralph A. Leonard, River Forest; Otto C. Linhart, Riverside, both of Ill.

[73] Assignee: Eagle-Picher Industries, Inc., Cincinnati, Ohio

[21] Appl. No.: 939,796

[22] Filed: Sep. 5, 1978

Related U.S. Application Data

[63] Continuation-in-part of Ser. No. 670,945, Mar. 26, 1976, abandoned.

[51] Int. Cl.² .............................................. B05D 3/02
[52] U.S. Cl. ....................................... 427/27; 106/48; 427/193; 427/203; 427/204; 427/205; 427/399; 427/380; 427/376.2; 427/376.5; 427/419.4
[58] Field of Search ................... 427/27, 193, 201–205, 427/376 D, 419 C, 376 A, 380, 399; 148/6; 106/48

[56] References Cited

U.S. PATENT DOCUMENTS

| | | | |
|---|---|---|---|
| 2,495,762 | 1/1950 | Porter | 427/376 D |
| 2,786,782 | 3/1957 | Zimmerman et al. | 427/376 D |
| 2,828,218 | 3/1958 | Zimmerman et al. | 427/376 D |
| 2,842,458 | 7/1958 | Feeney et al. | 427/376 D |
| 2,864,721 | 12/1958 | King et al. | 427/376 D |
| 3,178,323 | 4/1965 | Brown et al. | 427/376 D |
| 3,278,324 | 10/1966 | Nelson | 427/193 X |
| 3,928,668 | 12/1975 | Snow | 427/27 X |
| 3,930,062 | 12/1975 | Nedeljkovic | 427/27 |
| 4,110,487 | 8/1978 | Rion | 427/193 |

*Primary Examiner*—Shrive P. Beck
*Attorney, Agent, or Firm*—Hill, Van Santen, Steadman, Chiara & Simpson

[57] ABSTRACT

A method and composition for enameling ferrous objects which eliminates the necessity of pickling and nickel coating the ferrous object prior to enameling. The ferrous surface is merely cleaned and then a reactive fritted coating is applied to the clean surface. The chemical and physical properties of the reactive coating are such that the coating fuses at a relatively low temperature to provide a fused coating which chemically etches the underlying ferrous surface to provide a good bond between the two. The reactive coating should contain at least 5% of one or more adhesion promoting oxides, and at least 1% of the 5% mentioned consists of cupric oxide. A cover coat of a conventional frit may be applied over the reactive coating. During firing, the reactive coat melts first and bonds itself to the underlying ferrous surface, whereupon the cover coat fuses and forms the finished procelain enamel coating. In the preferred form of the invention, both the reactive coating and the cover coat are applied electrostatically.

8 Claims, No Drawings

METHOD FOR ENAMELING FERROUS OBJECTS

REFERENCE TO RELATED APPLICATION

This application is a continuation-in-part of our co-pending Ser. No. 670,945, filed Mar. 26, 1976 and now abandoned.

BACKGROUND OF THE INVENTION

1. Field of the Invention

This invention is in the field of applying porcelain enamel coatings and, more specifically, is directed to a method of treating a ferrous surface for the reception of a porcelain enamel coating, the pre-treating being done by means of a soft glass composition preferably in fritted form which reacts with the underlying ferrous surface to etch the same and provide a means for bonding the enamel coating to the underlying surface.

2. Description of the Prior Art

Ever since sheet steel has been provided with procelain enamel coatings, it has been considered necessary to subject the steel to a varied series of plating and preparation steps in order to improve the adhesion and the appearance of the porcelain enamel. The only exception to this rule has been in connection with very thin hollow ware of a very inexpensive nature where surface preparation was kept at a minimum. In any quality work, however, it was always considered necessary to prepare the surface by chemical and mechanical procedures before the procelain enamel frit was applied. A typical series of treatment steps for a steel sheet involved first repeatedly dipping the sheet in an alkaline cleaner at temperatures ranging from about 140° to 212° F. (60° to 100° C.). This was followed by a warm rinse with water at about 120° to 140° F. (49° to 60° C.). Following the warm rinse, there was usually a cold rinse with water at room temperature. Then came a pickling step with which the washed material was treated with a solution of 5 to 10% sulfuric acid at temperatures ranging from about 150° to 160° F. (66° to 71° C.). Following the pickling step, the material was again rinsed with water containing some small amount of sulfuric acid at room temperature. Following the cold rinsing step, a flash nickel deposition took place using temperatures of 130° to 180° F. (60° to 82° C.) to deposit about 0.02 to 0.6 grams of nickel per square foot. Following the nickel deposition, the steel was again cold rinsed with water and a small amount of sulfuric acid to prevent formation of ferric iron. Finally, the surface was neutralized with agents such as sodium carbonate and borax at temperatures of about 120° to 130° F. (49° to 54° C.). The equipment required for this extensive treatment necessitated substantial capital investment and the time and labor involved provided a substantial portion of the cost of the enameled product.

There have been a few disclosures in the prior art which sought to avoid the expensive and time-consuming pickling and nickel coating steps in enameling steel but to our knowledge they had little or no success commercially. One such disclosure appears in the expired Zimmerman U.S. Pat. No. 2,828,218 which described a frit which was applied as a ground coat to a metallic surface at an application weight of ⅛ to ⅜ ounces per square foot dry weight. The frit composition included materials such as flint, feldspar, dehydrated borax, soda ash, sodium nitrate, fluorospar, calcspar and red iron oxide. A conventional porcelain enamel cover coat was applied over the fired ground coat.

An improvement to this type of process is found in U.S. Pat. No. 2,786,782 issued to Zimmerman et al. In this patent, Zimmerman et al suggested adding black iron oxide (magnetite) and zinc oxide to frit compositions in order to improve the adherence. This material was applied in the conventional manner with mill additions as a ground coat, and after firing of the ground coat, a conventional porcelain enamel frit was applied and fired. Typically, the ground coat of this patent had from 5 to 13% magnetite, 2 to 7% zinc oxide, 35 to 42% silica, 20 to 25% boric oxide, 11 to 22% of one or more alkali metal oxides, 4 to 6% calcium oxide and 3 to 5% alumina.

A third reference which refers to the possibility of eliminating surface preparation such as etching or metal plating is U.S. Pat. No. 2,864,721 issued to King et al. This disclosure deals with a ground coat produced by milling a slip directly from raw batch enameling materials, without fritting, and applying the slip to the metallic article at a dry weight of 8 to 17 grams per square foot. The preferred ground coat included from 1 to 15% magnetite, 0 to 9% zinc oxide, 30 to 45% silica, 17 to 28% boric oxide, 11 to 22% of an alkali metal oxide, 3 to 8% calcium oxide, and 0 to 7% alumina.

In recent times, the technique of applying a ground coat and a cover coat of procelain enamel by means of electrostatic deposition has become more popular. Particular emphasis has been placed upon providing a two coat-one fire system for steels such as cold rolled steel. Examples of such current practice will be found in publications such as "Rationalization in the Enamelling Industry With Electrostatic Dry Procedures", a paper given at the International Congress in Vitreous Enamelling, in October, 1975; an article in "Iron Age" for December 15, 1975 entitled "Enamelers Place Hopes in Dry Frit Spraying", pages 49 to 52; and the article entitled "Powder: A Shot in the Arm for Porcelain Enameling" appearing in Industrial Finishing, January, 1976, pages 29 to 31. In each of these articles, however, the two coat-one fire system was applied to regularly pickled workpieces.

SUMMARY OF THE INVENTION

The present invention provides an improved method for applying high quality porcelain enamel to a workpiece, particularly to a workpiece composed of steel such as cold rolled steel which has heretofore been enameled only with great difficulty. The process of the present invention makes it unnecessary to employ either a pickling step or a flash nickel coating or surface roughening in preparing the metal surface for enameling. Instead, a reactive coat is first deposited on the surface of the workpiece, the reactive coat being classified as a "soft" glass meaning that it is highly fluid, i.e., it has a relatively low viscosity at temperatures below the firing temperature for the cover coat. The reactive coating consists of a borosilicate glass frit containing at least one adhesion promoting oxide which may be cupric oxide alone or cupric oxide in combination with one or more of the following:

Nickel oxide (NiO),
Cobalt oxide (CoO), or
Manganese oxide (MnO).

The borosilicate glass matrix contains at least 5% of the adhesion promoting oxide or oxides of which at least one of the 5% is represented by cupric oxide. The amount of reactive oxide is broadly in the range from 5 to 12% by weight. The preferred cupric oxide concentration is 2 to 9%, and a range of 3.5 to 7% represents the optimum value. The reactive coating also has an alkali (Li$_2$O plus Na$_2$O plus K$_2$O) to silica ratio of at least 0.40. In terms of physical properties, the fusion flow of the reactive coating at 1520° F. (826° C.) is at least twice as long as that of the cover coat. The temperature at which the reactive coating becomes molten is at least 100° F. below the temperature at which the cover coat becomes molten. The most desirable reactive coatings are those which are capable of being melted at a temperature not in excess of 1200° F. to produce a relatively fluid glass coating which chemically etches the underlying ferrous surface.

The reactive coating is applied to a thickness of about 0.5 to 2 mils (12 to 51 microns). The preferred coating application for the reactive coat is in the range from 1 to 1.5 mils (25 to 38 microns). While the reactive coating and the overlying cover coating can both be applied by conventional processes of wet application, for the purposes of the present invention it is preferred that both these coatings be applied electrostatically. To aid in the electrostatic deposition of the reactive coat, the coating particles are preferably encapsulated to provide an electrical resistivity in the range from $10^{12}$ to $10^{16}$ ohm centimeters.

The application of the reactive coat is followed by the application of a dry porcelain enamel cover coat also preferably by the electrostatic deposition process. This cover coat can be encapsulated to provide an electrical resistivity for the particles in the aforementioned range. Then, the thus-coated workpiece is fired at a temperature sufficient to cause fusion of the porcelain enamel frit in the cover coat, and reaction of the soft glass or reactive coating with the underlying workpiece surface. Typical firing temperatures range from about 1300° to 1600° F. (704° to 871° C.) and preferably from 1400° to 1500° F. (760° to 816° C.).

DESCRIPTION OF THE PREFERRED EMBODIMENTS

The only pre-treatment required for the ferrous workpiece in accordance with the present invention is a simple cleaning, typically with an alkaline type cleaner, followed by rinsing and drying. Neither acid pickling nor nickel flash coating is required to secure adequate adhesion of the porcelain enamel layer onto the workpiece.

The nature of the reactive coating is instrumental in achieving the improved results according to the present invention. The reactive coating is characterized as a very soft glass, i.e., one that has a low viscosity at relatively low firing temperatures. The ingredients in the borosilicate glass matrix are arranged so that the reactive coating melts at a temperature at least 100° F. below the temperature at which the cover coat melts, and typically melts at below 1200° F.

The reactive coating must melt and flow out before the porcelain enamel cover coat melts or else specks of the coating will be visible in the cover coat. To determine the proper relationship between the viscosities of the molten reactive coating and the molten cover coat, we used the standard fusion flow test. The test details are given in ASTM Test Method C 374-70 entitled "Fusion Flow of Porcelain Enamel Frits (Flow-Button Methods)". This publication is incorporated herein by reference. We used 3.0 gram frit samples and made the tests at 1520° F. (826° C.). We found that the flow-button form from the reactive coating should be at least twice as long as that for the cover coat, and can be as long as 20 times. Preferably, the flow from the reactive coating button should be from 3 to 10 times the flow measured for the cover coat button.

The reactive coating is preferably based on a borosilicate glass matrix having the following composition in melted form, exclusive of the adhesion promoting oxides:

| Ingredient | Broad Range | Preferred Range |
| --- | --- | --- |
| SiO$_2$ | 16–45% by wt. | 19–39% by wt. |
| F$_2$ | 1.7–12.1% by wt. | 3.4–8.6% by wt. |
| Na$_2$O or K$_2$O, Li$_2$O or mixtures | 10–25% by wt. | 17–23% by wt. |
| B$_2$O$_3$ | 10–26% by wt. | 17–26% by wt. |
| CaO or BaO or both | 2–20% by wt. | 11–17% by wt. |

As noted previously, cupric oxide is instrumental in securing the improved results of the present invention. This oxide may be used in amounts of from 1 to 12% of the melted composition in combination with other adherence promoting oxides and preferably constitutes from 2 to 9% by weight of the melted composition. The optimum range of cupric oxide is 3.5 to 7%. Additionally, nickel oxide can be used in combination with cupric oxide, in amounts of from 0.5 to 1.6% by weight of the melted composition and preferably from 0.9 to 1.3% by weight.

Cobalt oxide (CoO) in amounts of from 0 to 1% and preferably from 0.5 to 0.9% of the melted composition also improves the adhesion. Another oxide which can be used is manganese oxide (MnO) in amounts of from 0 to 5% by weight of the melted composition and preferably from 0 to 1% by weight. These oxides combined with the cupric oxide should total at least 5% by weight of that frit.

Still other oxides can be added for various purposes, including improvement of bond or adjustment of the flow rate. These miscellaneous oxides are given in the following table:

| Oxide | Broad Range | Preferred Range |
| --- | --- | --- |
| ZnO | 0–5% by weight | 2–4% by weight |
| Al$_2$O$_3$ | 0–6% by weight | 0–2% by weight |
| P$_2$O$_5$ | 0–5% by weight | 0–2% by weight |
| TiO$_2$ | 0–5% by weight | 0–1% by weight |
| Li$_2$O | 0–2.2% by weight | 0–1.5% by weight |

While many different oxides can be used in the reactive coating, as noted above, there are several oxides which should not be used because they tend to destroy the bond when added to the reactive coating. These oxides are iron oxide, antimony oxide and molybdenum oxide. The effect of iron oxide is just the contrary to its effect in the compositions described in the Zimmerman U.S. Pat. Nos. 2,786,782 and 2,828,218, and Burnham et al U.S. Pat. No. 2,864,721 who teach the use of iron oxide as an adherence metal oxide in conventional ground coat frits. When used in the compositions of the present invention, iron oxides give no bond and provide pits in the coating.

The reactive coating can be smelted in the conventional manner for the frits. Typically, we use an 1800° F.

(982° C.) rotary smelter with a 30 minute residence time.

Specific reactive coating compositions have been made up from the following raw batch compositions:

water, it is recommended that the frit be produced by roll quenching instead of by quenching under water.

It is also highly desirable that both the reactive coating and the porcelain enamel should be finely divided

| RAW MATERIAL | Raw Batch Compositions | | | | | | | | | | | | | |
|---|---|---|---|---|---|---|---|---|---|---|---|---|---|
| | A % | B % | C % | D % | E % | F % | G % | H % | I % | J % | K % | L % | M % | N % |
| Silica | 20.2 | 20.7 | 16.0 | 14.6 | 20.9 | 25.7 | 20.2 | 20.4 | 16.0 | 15.9 | 20.0 | 17.8 | 20.9 | 15.6 |
| Feldspar | — | — | — | — | — | — | — | — | 21.1 | — | — | — | — | — |
| Fluorspar | 3.1 | 3.1 | 3.1 | 11.0 | 5.9 | 10.9 | 10.9 | 11.0 | 7.5 | 3.1 | 3.1 | 3.1 | 3.1 | 3.1 |
| Soda Ash | 0.5 | 3.1 | 2.2 | 3.9 | 1.2 | 6.7 | 4.4 | 4.7 | 13.9 | 2.3 | 5.1 | — | 2.3 | — |
| Sodium Nitrate | 0.8 | 0.8 | 0.8 | 0.9 | 0.9 | 0.9 | 0.9 | 0.9 | 1.0 | 0.8 | 0.8 | 0.9 | 0.8 | 0.8 |
| Cryolite | 6.6 | — | — | — | — | 6.8 | 6.8 | 6.8 | — | — | 6.6 | — | — | — |
| Zinc Oxide | 2.9 | 2.9 | 2.9 | 3.0 | 3.1 | 3.0 | 3.0 | 3.0 | — | 2.9 | 2.9 | 2.9 | 2.9 | 2.9 |
| Calcium Carbonate | 9.5 | 9.4 | 9.4 | — | 2.4 | — | — | — | — | 9.4 | 9.5 | 9.5 | 9.4 | 9.5 |
| Barium Carbonate | 6.9 | 6.9 | 6.9 | 7.1 | — | 7.1 | 7.1 | 7.1 | 9.6 | 6.9 | 6.9 | 6.9 | 6.9 | 6.9 |
| Potassium Carbonate | 4.9 | 4.8 | 4.9 | 5.0 | 5.1 | 5.0 | 5.0 | 5.0 | — | 4.9 | 4.2 | 4.9 | 4.9 | 4.9 |
| Sodium Silicofluoride | 7.7 | 13.4 | 13.4 | 6.8 | 11.8 | 0.8 | 0.8 | 0.8 | 0.5 | 13.4 | 7.6 | 13.6 | 13.4 | 13.5 |
| Anhydrous Borax | 26.0 | 25.6 | 25.7 | 33.4 | 34.3 | 22.7 | 26.8 | 26.8 | 24.0 | 25.7 | 26.1 | 22.9 | 25.8 | 30.4 |
| Cobalt Oxide | 0.7 | 0.7 | 0.7 | 0.7 | 0.7 | 0.7 | 0.7 | 0.7 | 0.5 | 0.7 | 0.7 | 0.7 | 0.7 | 0.7 |
| Manganese Dioxide | 0.8 | 0.8 | 0.8 | 0.8 | 0.8 | 0.8 | 4.4 | 0.8 | 1.0 | 0.8 | 0.8 | 0.8 | — | 0.8 |
| Lithium Carbonate | 3.2 | 3.2 | 3.2 | 3.4 | 3.4 | 3.3 | 3.3 | 3.4 | — | 3.2 | — | 3.2 | 3.2 | 3.2 |
| Sodium Phosphate | 1.0 | — | 1.0 | — | — | 1.0 | 1.0 | 1.0 | — | 1.0 | 1.0 | 5.9 | 1.0 | 1.0 |
| Nickel Oxide | 1.1 | 1.1 | 1.1 | 1.2 | 1.2 | 1.0 | 1.0 | 1.2 | 1.3 | 1.1 | 1.1 | 1.1 | 1.1 | 1.7 |
| Anhydrous Boric Acid | — | — | — | — | — | — | — | — | — | — | — | 2.2 | — | 1.4 |
| Titanium Dioxide (Rutile) | — | — | — | — | — | — | — | 2.7 | — | — | — | — | — | — |
| Copper Oxide | 3.6 | 3.5 | 7.9 | 8.2 | 8.3 | 3.6 | 3.7 | 3.7 | 3.6 | 7.9 | 3.6 | 3.6 | 3.6 | 3.6 |
| | 100.0 | 100.0 | 100.0 | 100.0 | 100.0 | 100.0 | 100.0 | 100.0 | 100.0 | 100.0 | 100.0 | 100.0 | 100.0 | 100.0 |

These raw batch compositions resulted in the following melted composition:

for deposition by electrostatic coating. Generally, the frit in each case is ground in a ball mill to a retention of

| OXIDE | MELTED COMPOSITIONS | | | | | | | | | | | | | |
|---|---|---|---|---|---|---|---|---|---|---|---|---|---|---|
| | A % | B % | C % | D % | E % | F % | G % | H % | I % | J % | K % | L % | M % | N % |
| $SiO_2$ | 26.9 | 29.4 | 23.8 | 19.4 | 27.4 | 30.0 | 24.0 | 24.0 | 38.2 | 28.8 | 26.0 | 25.8 | 27.6 | 23.8 |
| $F_2$ | 7.3 | 7.3 | 7.3 | 7.3 | 7.3 | 7.3 | 7.3 | 7.3 | 3.4 | 7.3 | 7.3 | 7.3 | 7.3 | 7.3 |
| $Na_2O$ | 16.6 | 16.6 | 16.6 | 16.6 | 16.6 | 16.6 | 16.6 | 16.6 | 10.7 | 16.6 | 19.6 | 16.6 | 16.6 | 16.6 |
| $ZnO$ | 3.3 | 3.3 | 3.3 | 3.3 | 3.3 | 3.3 | 3.3 | 3.3 | — | 3.3 | 3.3 | 3.3 | 3.3 | 3.3 |
| $CaO$ | 8.6 | 8.5 | 8.5 | 8.5 | 4.5 | 8.5 | 8.5 | 8.5 | 6.3 | 8.5 | 8.5 | 8.5 | 8.5 | 8.5 |
| $BaO$ | 6.0 | 6.0 | 6.0 | 6.0 | 2.0 | 6.0 | 6.0 | 6.0 | 8.8 | 6.0 | 6.0 | 6.0 | 6.0 | 6.0 |
| $K_2O$ | 3.7 | 3.7 | 3.7 | 3.7 | 3.7 | 3.7 | 3.7 | 3.7 | 2.7 | 3.7 | 3.2 | 3.7 | 3.7 | 3.7 |
| $Al_2O_3$ | 1.8 | — | — | — | — | 1.8 | 1.8 | 1.8 | 4.4 | — | 1.8 | — | 1.8 | — |
| $CoO$ | 0.7 | 0.7 | 0.7 | 0.7 | 0.7 | 0.7 | 0.7 | 0.7 | 0.6 | 0.7 | 0.7 | 0.7 | 0.7 | 0.7 |
| $MnO$ | 0.6 | 0.6 | 0.6 | 0.6 | 0.6 | 0.6 | 3.6 | 0.6 | 0.9 | 0.6 | 0.6 | 0.6 | — | 0.6 |
| $Li_2O$ | 1.5 | 1.5 | 1.5 | 1.5 | 1.5 | 1.5 | 1.5 | 1.5 | — | 1.5 | — | 1.5 | 1.5 | 1.5 |
| $P_2O_5$ | 0.6 | — | 0.6 | — | — | 0.6 | 0.6 | 0.6 | — | 0.6 | 0.6 | 3.6 | 0.6 | 0.6 |
| $NiO$ | 1.3 | 1.3 | 1.3 | 1.3 | 1.3 | 1.3 | 1.3 | 1.3 | 1.6 | 1.3 | 1.3 | 1.3 | 1.3 | 1.3 |
| $B_2O_3$ | 20.1 | 20.1 | 20.1 | 25.1 | 25.1 | 17.1 | 20.1 | 20.1 | 19.7 | 20.1 | 20.1 | 20.1 | 20.1 | 20.1 |
| $CuO$ | 4.1 | 41. | 9.1 | 9.1 | 9.1 | 4.1 | 4.1 | 4.1 | 4.1 | 4.1 | 4.1 | 4.1 | 4.1 | 9.1 |
| $TiO$ | — | — | — | — | — | — | — | 3.0 | — | — | — | — | — | — |
| | 103.1 | 103.1 | 103.1 | 103.1 | 103.1 | 103.1 | 103.1 | 103.1 | 101.4 | 103.1 | 103.1 | 103.1 | 103.1 | 103.1 |
| Minus O for $F_2$ | 3.1 | 3.1 | 3.1 | 3.1 | 3.1 | 3.1 | 3.1 | 3.1 | 1.4 | 3.1 | 3.1 | 3.1 | 3.1 | 3.1 |
| | 100.0 | 100.0 | 100.0 | 100.0 | 100.0 | 100.0 | 100.0 | 100.0 | 100.0 | 100.0 | 100.0 | 100.0 | 100.0 | 100.0 |

The reactive coating is preferably applied in fritted form. Since the composition is highly susceptible to 0.2 to 2% on a 200 mesh screen (3 to 12% on a 325 mesh screen).

Since the reactive coat and the cover coat are both applied by electrostatic deposition, it is important that the resistivity of the porcelain enamel powder be controlled for spraying efficiency and also for adherence to the metal. Consequently, it is highly desirable to encapsulate the electrostatically sprayed particles in a synthetic resin in order to increase the resistivity of the particles to the range of $10^{12}$ to $10^{16}$ ohm centimeters. To accomplish this, we preferably make use of the techniques described and claimed in the Nedeljkovic U.S. Pat. No. 3,930,062, issued Dec. 30, 1975 and assigned to the same assignee as the present application. The disclosure of the Nedeljkovic patent is also incorporated herein by reference.

Briefly stated, the Nedeljkovic patent describes a method of pre-treating borosilicate glass powders to reduce their caking tendencies and to bring their resistivities up to where they can be successfully sprayed by electrostatic deposition techniques. The anti-caking capabilities of the compositions are improved by reacting the frit in particulate form with an alkoxysilane having the formula:

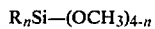
$$R_n Si\text{—}(OCH_3)_{4-n}$$

where R is a methyl or phenyl group, or both, and n is 1 or 2.

These materials are combined with the frit in an amount of about 0.2 to 0.8% by weight of the mixture. Apparently the alkoxysilane reacts with water present to form silanole which then presumably reacts with the hydroxyl groups in the glass to improve the electrical resistivity.

The dry adherence of the frit to the substrate can be improved by treating the frit with an adhesion promoter consisting of silazane having the following formula:

$$R_3\text{—}Si\text{—}NH\text{—}Si\text{—}R_3$$

where R is hydrogen, an alkyl radical, an aryl radical, or a combination of alkyl and aryl radicals.

These materials are added in amounts of about 0.05 to 0.5% by weight.

Additional benefits are derived in terms of improving the deposition rate, when the mixture being sprayed also includes a chlorosilane having the formula:

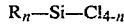
$$R_n\text{—}Si\text{—}Cl_{4-n}$$

where R is an alkyl or aryl radical, or both, and n is 1, 2 or 3.

The reactive coating is applied to the ferrous surface to a thickness in the range of about 0.5 to 2 mils (12 to 51 microns). Preferably, the coating thickness is on the order of 1 to 1.5 mils (25 to 38 microns).

After application of the reactive coating, a conventional porcelain enamel frit can be applied dry over the precoated surface, also by means of electrostatic deposition. In order to increase the electrical resistivity of the porcelain enamel frit to increase its adhesion tendencies, this frit is also treated by encapsulation with a synthetic resin such as polyethylene, or with the silane compounds referred to in the aforementioned Nedeljkovic patent. In any event, the electrical resistivity of the porcelain enamel frit is modified until it is in the range of $10^{12}$ to $10^{16}$ ohm centimeter.

Following application of the cover coat, the coated article is then fired in the normal way at temperatures ranging from about 1300° to 1600° F. (704° to 871° C.) and preferably from 1400° to 1500° F. (760° to 816° C.).

EXAMPLE 1

Pieces of cold rolled steel having thicknesses between 18 and 22 gauge (0.079 to 0.127 cm) were coated with a reactive fritted soft glass composition having the following melted analysis:

| | | |
|---|---|---|
| $SiO_2$ | 26.8% | by weight |
| $F_2$ | 7.3% | " |
| $Na_2O$ | 16.6% | " |
| $ZnO$ | 3.3% | " |
| $CaO$ | 8.5% | " |
| $BaO$ | 6.2% | " |
| $K_2O$ | 3.7% | " |
| $Al_2O_3$ | 1.8% | " |
| $CoO$ | 0.7% | " |
| $MnO$ | 0.6% | " |
| $Li_2O$ | 1.5% | " |
| $P_2O_5$ | 0.6% | " |
| $NiO$ | 1.3% | " |
| $B_2O_3$ | 20.1% | " |
| $CuO$ | 4.1% | " |
| | 103.1 | |
| Minus O for $F_2$ | 3.1 | |
| | 100.0 | |

The coating was applied to a thickness of about 1 mil (25 microns) by means of a DeVilbiss electrostatic spray gun used for the application of porcelain enamel coatings. The surface of the cold rolled steel had merely been washed, rinsed and dried prior to application of the coating. Next, a commercial cover coat (Chi-Vit 14350) was milled to a fineness of 0.5 retention on a 200 mesh screen and it was then screened using a 60 mesh screen. Approximately 0.5% of methyl trimethoxy silane and 0.2% of hexamethyl disilazane were added to the powder. This material was electrostatically sprayed over the precoated part and then fired at 1450° F. (788° C.) for 3½ minutes. The resulting porcelain enamel coating exhibited good adherence to the substrate and was of good quality.

EXAMPLE 2

A reactive coating according to the present invention (Frit No. 21) and five low-melting temperature ground coat frits were evaluated from the standpoint of adherence. The theoretical melted compositions of the six frits are reproduced below:

| Frit No. | 21 | 80 | 19 | 60 | 74 | 06 |
|---|---|---|---|---|---|---|
| $SiO_2$ | 36.72 | 36.08 | 30.99 | 32.31 | 32.28 | 37.92 |
| $CaF_2$ | 2.70 | 1.87 | 2.48 | 2.61 | 2.62 | 1.88 |
| $Na_2O$ | 12.19 | 17.73 | 17.92 | 14.45 | 17.62 | 19.29 |
| $ZnO$ | — | — | — | 2.75 | 1.24 | — |
| $CaO$ | 8.51 | 7.60 | 9.48 | 6.96 | 5.63 | 7.75 |
| $BaO$ | 6.01 | 7.30 | 6.78 | 10.38 | 3.49 | 6.10 |
| $K_2O$ | 3.68 | 3.07 | 3.36 | 2.22 | — | 0.57 |
| $ZrO_2$ | — | — | — | 2.31 | 9.21 | — |
| $Al_2O_3$ | 1.91 | 2.24 | 4.51 | 3.96 | 5.47 | 2.59 |
| $CoO$ | 0.69 | 0.25 | 0.73 | 0.61 | 0.81 | 0.45 |
| $MnO$ | 0.63 | — | 0.71 | 1.05 | — | 1.05 |
| $Li_2O$ | 1.50 | — | 0.55 | 1.04 | 1.46 | — |
| $P_2O_5$ | — | 0.79 | 0.71 | 0.63 | — | 0.80 |
| $NiO$ | 1.27 | 1.56 | 1.27 | 1.02 | 1.00 | 0.33 |
| Rare earth oxides | — | — | — | 1.28 | — | — |
| $B_2O_3$ | 20.09 | 20.73 | 19.59 | 15.91 | 19.17 | 21.27 |
| $CuO$ | 4.10 | 0.78 | 0.92 | 0.51 | — | — |

The adherence was tested by means of the following procedure. The enamel samples were placed flat on a cylindrical mount beneath the plunger of a drop-weight adherence test apparatus. A five pound drop weight was released with a trigger mechanism and allowed to drop in free fall a distance of 4½ inches to the plunger head. The impact of a ½-inch steel ball at the tip of the plunger produces a round concave dent in the test sample approximately 25 mm in diameter where the test sample is 20 gauge enameling iron. A visual examination of the impact area of the test sample was then made. The adherence is graded on a scale of 1 to 5, 1 being poor and 5 being excellent.

The following table sets forth the adherence ratings of the various frits:

| Enameling Conditions | Firing temp. °F. | Aherence of Frit No. | | | | | |
|---|---|---|---|---|---|---|---|
| | | 21 | 19 | 60 | 80 | 74 | 06 |
| Cold rolled steel, reactive coating 5g/ft², cover coat 30g/ft² | 1400 | 1 | 1 | 1 | 1 | 1 | 1 |
| | 1450 | 3 | 2 | 2 | 2 | 1 | 1 |
| | 1500 | 4 | 3 | 3 | 2 | 1 | 1 |
| Cold rolled steel, reactive coating 20g/ft² | 1300 | 3 | 1 | 1 | 1 | 1 | 1 |
| | 1400 | 5 | 3 | 1 | 4 | 1 | 1 |
| | 1450 | 5 | 3 | 4 | 4 | 1 | 1 |
| | 1500 | 5 | 3 | 5 | 4 | 3 | 1 |
| Enameling iron, reactive coating 20g/ft² | 1450 | 5 | 5 | 4 | 5 | 2 | 1 |
| Decarburized steel, 20g/ft² | 1450 | 2 | 2 | 1 | 1 | 1 | 1 |
| Sum of adherence numbers | | 33 | 23 | 22 | 24 | 12 | 9 |

The advantages of the process of the present invention are numerous. For one, it eliminates the pickling step, the nickel plating tanks, associated rinse tanks and milling equipment. Furthermore, it allows the use of non-premium steels in a one-fire enameling process. This, in turn, provides savings in floor space, capital equipment cost, energy, labor and materials, as well as less water pollution. The quality of the finished part is comparable to that obtained by current porcelain enameling processes.

It will be understood that various modifications can be made to the described embodiments without departing from the scope of the present invention.

We claim as our invention:

1. The method of applying a porcelain enamel coating to a ferrous workpiece which comprises cleaning said workpiece to leave a clean, unpickled, nickel-free surface, applying a dry particulate reactive porcelain enamel coating to said surface, said reactive coating being capable of fusing into a molten mass which significantly etches the underlying surface, said reactive coating containing at least one oxide selected from the group consisting of cupric oxide, nickel oxide, cobalt oxide, and manganese oxide, and mixtures thereof, said reactive coating containing at least 5% by weight of said selected oxide, said reactive coating further containing at least 1% cupric oxide, and having an alkali to silica ratio of at least 0.40, applying a cover coat of porcelain enamel having a melting temperature at least 100° F. higher than that of said reactive coating over said reactive coating, the fusion flow of the reactive coating at 1520° F. being at least twice as long as that of said cover coat, firing the thus coated workpiece at a temperature sufficient to first cause the reactive coating to fuse and adhere to the workpiece by etching the same, and raising the temperature sufficiently high to fuse said cover coat.

2. The method of claim 1 in which both said reactive coating and said cover coat are applied electrostatically.

3. The method of claim 1 in which said reactive coating contains from 5 to 12% by weight of said oxide.

4. The method of claim 1 in which said reactive coating contains 2 to 9% cupric oxide.

5. The method of claim 1 in which said reactive coating contains 3.5 to 7% cupric oxide.

6. The method of claim 1 in which said ferrous surface is cold rolled steel.

7. The method of claim 1 in which said reactive coating has the following melted composition, exclusive of said oxides:

| | | |
|---|---|---|
| $SiO_2$ | 16–45% | by weight |
| $F_2$ | 1.7–12.1% | by weight |
| $Na_2O$, $K_2O$, $Li_2O$, or mixtures | 10–25% | by weight |
| $B_2O_3$ | 10–26% | by weight |
| CaO, BaO or both | 2–20% | by weight |

8. The method of claim 1 in which said reactive coating has the following melted composition exclusive of said oxides:

| | | |
|---|---|---|
| $SiO_2$ | 19–39% | by weight |
| $F_2$ | 3.4–8.6% | by weight |
| $Na_2O$, $K_2O$, $Li_2O$ or mixtures | 17–23% | by weight |
| $B_2O_3$ | 17–26% | by weight |
| CaO, BaO or both | 11–17% | by weight |

* * * * *